United States Patent [19]

Cliff

[11] 4,313,457
[45] Feb. 2, 1982

[54] REMOVABLE CONDENSATE COLLECTOR FOR ELEVATED WATER STORAGE FACILITIES

[75] Inventor: John O. Cliff, Franklin, Tenn.
[73] Assignee: Pittsburgh-Des Moines Corporation, Pittsburgh, Pa.
[21] Appl. No.: 95,959
[22] Filed: Nov. 20, 1979
[51] Int. Cl.³ .................... E03B 11/00; E03B 9/00
[52] U.S. Cl. .................... 137/312; 222/108; 137/357; 220/219
[58] Field of Search .................... 34/93; 126/426; 137/312, 313, 357; 222/108; 220/1 B, 219, 1 C; 203/DIG. 1

[56] References Cited

U.S. PATENT DOCUMENTS

| | | | |
|---|---|---|---|
| 767,302 | 8/1904 | Malone | 222/108 |
| 1,997,529 | 4/1935 | Miller | 222/108 |
| 2,683,357 | 7/1954 | Albright | 137/313 |
| 3,337,418 | 8/1967 | Halacy, Jr. | 137/312 |

OTHER PUBLICATIONS

Pittsburgh-Des Moines Steel Copy "Hydro-Pillar", Bulletin 103-Copyright 4/71.

Primary Examiner—Martin P. Schwadron
Assistant Examiner—G. L. Walton
Attorney, Agent, or Firm—Shoemaker and Mattare, Ltd.

[57] ABSTRACT

A removable condensate collector for elevated water storage facilities includes a membrane attached to the walls of such elevated water storage facility and positioned to prevent condensate from falling onto structures located at or near the bottom of the facility from a water storage container located at or near the top of the facility. The membrane can be frusto-conical in shape with the apex thereof located above or below the base, or can be horizontally disposed within the facility.

9 Claims, 11 Drawing Figures

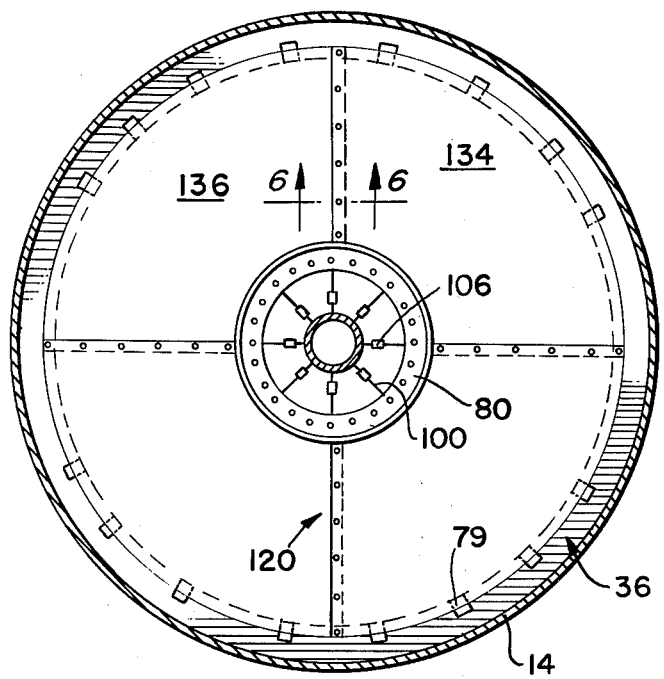
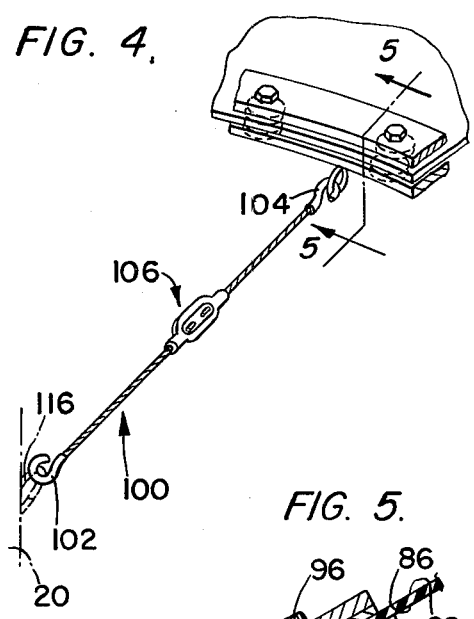
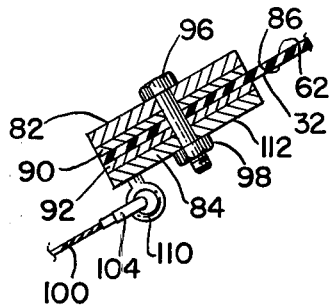
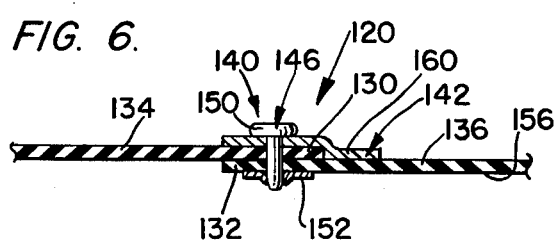
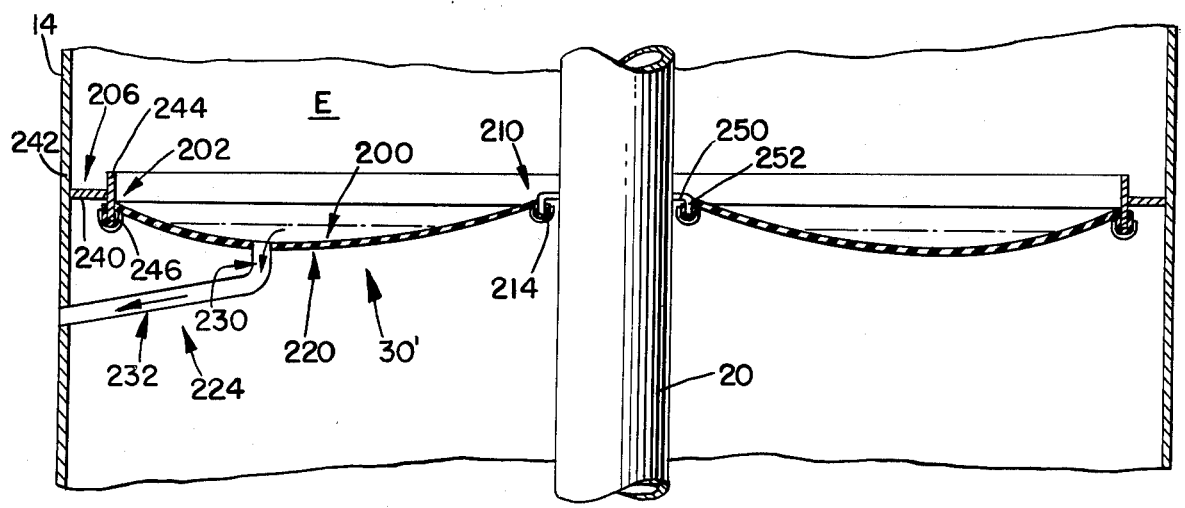

REMOVABLE CONDENSATE COLLECTOR FOR ELEVATED WATER STORAGE FACILITIES

BACKGROUND OF THE INVENTION

The present invention relates in general to elevated water storage facilities, and, more particularly, to condensate control in such facilities.

Elevated water storage facilities have a large interior volume which can be put to use in a manner disclosed in PDM Bulletin No. 103, dated April, 1971. Examples of such interior volume use include parking areas, office space, work areas, storage areas, shower areas attached to a work area, and the like. These areas can be insulated, lighted, air conditioned, or the like, as suitable.

All of the uses to which the interior volume of such elevated water storage towers are applied include the vertical partitioning of the interior volume by a ceiling structure. These ceilings can be acoustical ceilings or the like.

Condensation causes problems in such modified water storage towers. These problems arise because there is a mass of water overhead which is at approximately ground temperature. Because the water has been recently removed from the ground, or a reservoir, and pumped through underground piping, then stored in a container associated with such tower, this water is at or near a temperature of about 50° or 60° F., on the average. If the moisture content of the air inside the storage facility increases to a point where its dew point equals the temperature of the water stored in the container, moisture will begin to condense on the outside bottom of the container at the upper end of a riser. When sufficient condensation has occurred, water will begin to drip, and will drip onto anything which is stored at or near the base of the riser, such as offices or equipment, or the like.

This water can damage such equipment and stored items. Ceilings are also susceptible to such water damage.

Thus, there is need for a means of collecting the water before it drips onto equipment, or ceilings, or other elements located within the enclosure defined by the wall of an elevated water storage facility so that the water can be removed through a drain system to the outside of the enclosure. This permits storage of equipment and other uses of the building.

SUMMARY OF THE INVENTION

The structure embodying the teachings of the present invention prevents condensate formed on a water storage tank in an elevated water storage facility from falling onto elements located at or near the base of such facility.

The structure includes a condensate collecting means attached to the facility wall and to a riser within the facility and positioned between the underside of a water storage tank and the bottom of the facility. Such collector is thus positioned between the water storage tank and any elements located within the facility near the bottom thereof.

The preferred form of the collector includes a downwardly converging frusto-conical membrane which is fluidly connected to a circular trough attached to the riser. A drain system conducts water collected in the trough through the facility wall to a suitable disposal means or location.

The membrane is removably attached and thus renovation or modification of the facility is easily effected. A preferred form of the membrane includes a plurality of sections held together by watertight seams.

Another form of the invention includes a collector membrane which is horizontally disposed and which has a drain system attached thereto. As the membranes of the present disclosure are flexible, there is a bulge formed in the horizontally disposed membrane, and the drain system is attached to the membrane at or near the lowest point of the membrane.

OBJECTS OF THE INVENTION

It is a main object of the present invention to prevent water damage of equipment located in an elevated water storage facility due to condensation formed on a water tank in such facility.

It is another object of the present invention to prevent water damage of ceilings located in an elevated water storage facility due to condensation formed on a water tank in such facility.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 3 is a view taken along line 3—3 of FIG. 2.

FIG. 4 is a connector for connecting a condensation collector embodying the teachings of the present invention into a water storage facility.

FIG. 5 is a fastening collar used in the condensation collector embodying the teachings of the present invention.

FIG. 6 is a view taken along line 6—6 of FIG. 3.

FIG. 7 is an alternative embodiment of a condensation collector embodying the teachings of the present invention.

DETAILED DESCRIPTION OF THE INVENTION

Figure 1:
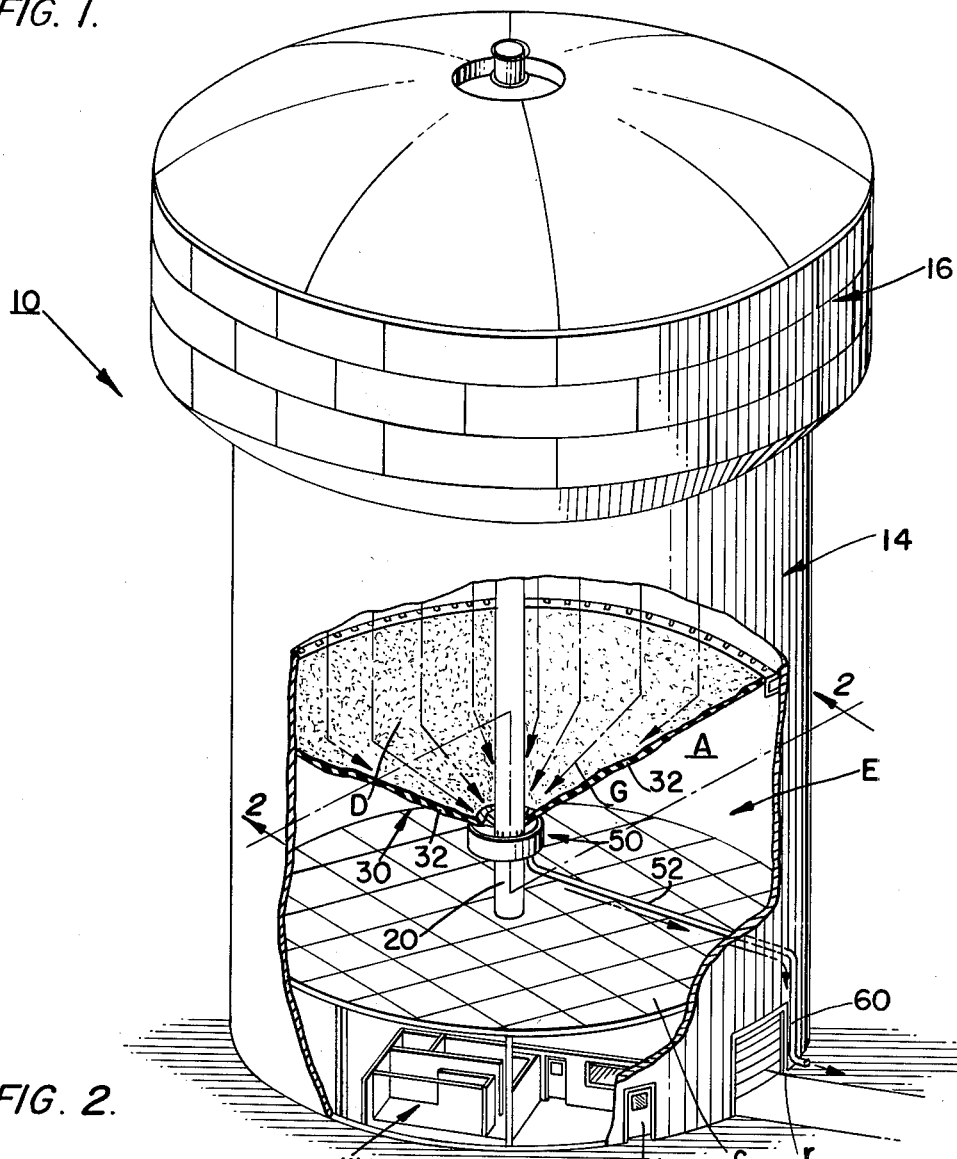
FIG. 1 is a perspective of an elevated water storage facility incorporating the condensation collector embodying the teachings of the present invention.

Shown in FIG. 1 is an elevated water storage tower 10 having a tank wall 14 based on a surface, such as the ground, a slab, or the like, supporting a water container 16 thereon. The tank wall defines an enclosed area E. Water is stored in the container 16 and passes through riser pipe 20. This water is often at a temperature in the range of 50° to 60° F., and thus condensate forms on the container lower surface located within the tank wall enclosure E when the conditions are proper. The condensate eventually falls off the container and falls downwardly toward the bottom of the tower under the influence of gravity.

As shown in FIG. 1, part of the enclosure E is partitioned off by a horizontally disposed ceiling C to define a work area W beneath the ceiling and an air space A above the ceiling. The work area can be a warehouse, parking garage, workshops, offices, storage areas or the like, or any combination thereof. The ceiling can be any type, such as an acoustical ceiling, or the like. Access doors, such as door d and rolling door r can be placed in the tank wall 14.

As indicated in FIG. 1, the condensate D falling from the water container 16 falls toward the ceiling C. Such condensate will collect on the ceiling, and eventually cause water damage to either the ceiling or to the materials contained in the enclosure E beneath the ceiling.

To prevent the falling condensate from ever reaching the ceiling, a condensate collector 30 is mounted between the container and the ceiling in the enclosure E.

Figure 2:
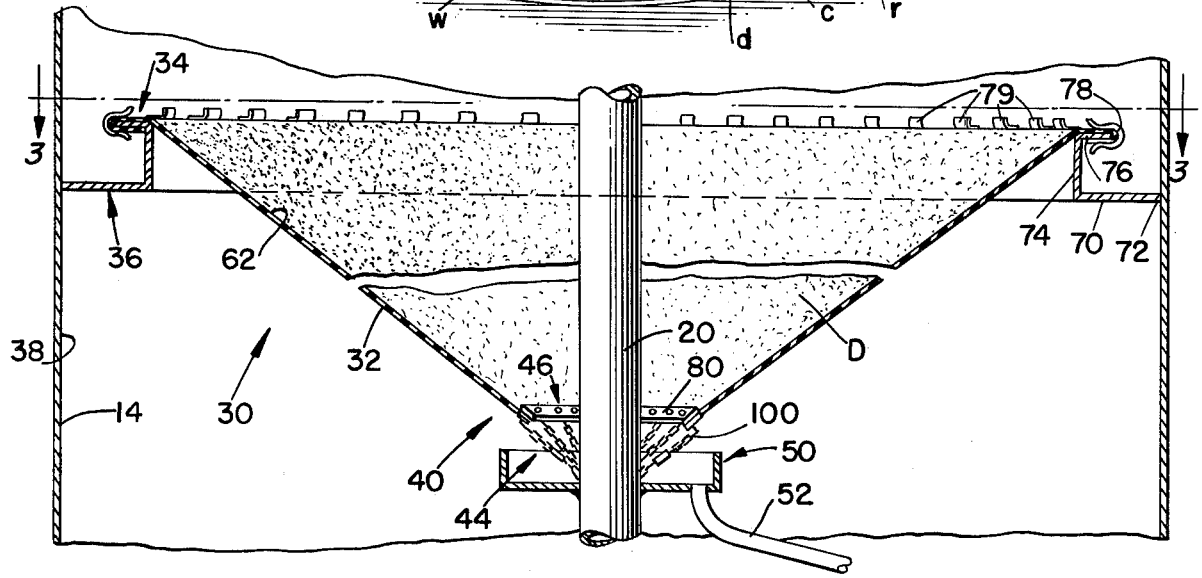
FIG. 2 is a view taken along line 2—2 of FIG. 1.

As best shown in FIGS. 1 and 2, the condensate collector 30 includes a downwardly converging frusto-conically shaped membrane 32 attached at the base peripheral edge 34 thereof to a bracket 36 mounted on inner surface 38 of the tank wall 14, and mounted near the apex edge 40 thereof to a harness 44 attached to the riser pipe 20. In the preferred form, the membrane has a slope of about 20° with the horizontal. Preferably, the membrane is a rubberized fabric.

The frusto-conically shaped membrane forms a funnel to catch condensate D and direct that caught condensate toward the apex edge 40 as indicated by arrows G in FIG. 1. The apex edge 40 is open to form a weep hole-like opening 46 through which the collected condensate passes. A catch basin 50 is attached as by welds, or the like, to the riser pipe beneath the opening 46 to collect the condensate passing from the opening 46. A condensate drain system includes a drain line 52 fluidly attached at one end thereof to the catch basin. The drain line passes out of the enclosure E and can have an open downspout 60, or can be connected to a disposal means, as suitable.

Condensate thus collects on the bottom of the container 16 when the atmospheric conditions and temperature of the water in the container are suitable for such action. The condensate eventually drops off the container and is caught by the membrane 32. The caught condensate flows over upper surface 62 of the downwardly converging frusto-conical membrane and flows through opening 46 into the catch basin 50, and from the catch basin to a disposal area via the drain line 52. No condensate ever reaches the ceiling C as the collector 30 intercepts that condensate before such condensate reaches the ceiling.

As best shown in FIG. 2, the preferred form of bracket 36 includes a base 70 attached at one edge thereof, as by welds 72, or the like, to the inner surface of wall 14 and which extends inwardly of the enclosure. A wall 74 is integral with the base 70 and extends upwardly therefrom, and a top lip 76 is integral with the wall 74 and extends back toward the wall 14 and has a free edge 78 thereon.

Figure 8:
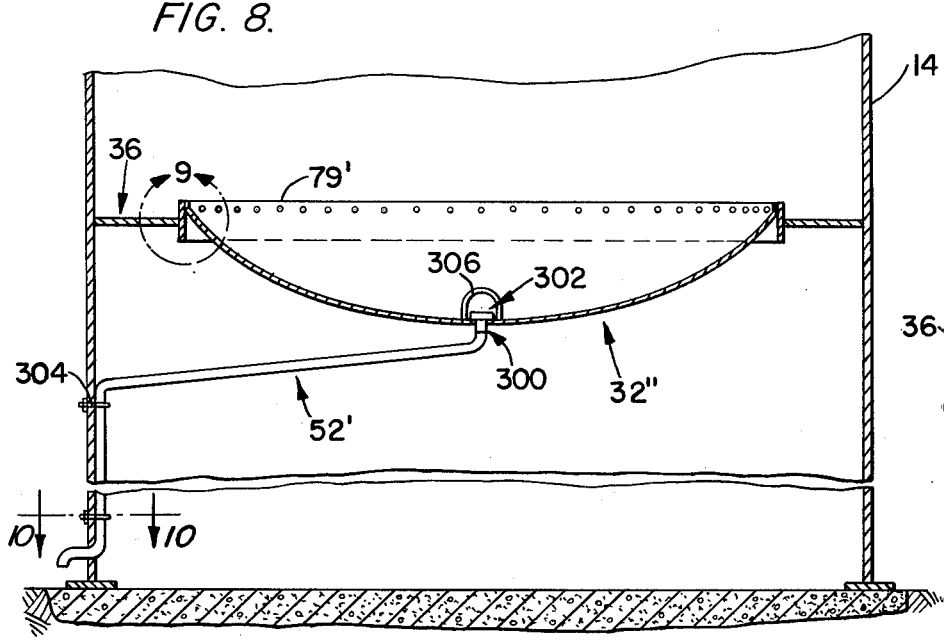
FIG. 8 is an elevation showing an embodiment of a condensation collector used on a water storage facility having no center riser pipe.

The membrane 32 is folded over the top lip 76, and is attached thereto by a plurality of fasteners, such as clips 79, which may include Tinnerman clips (R), or the like. As shown in FIG. 8, the membrane is attached to the stiffener ring 36 by bolts 79' in another embodiment of the invention.

The preferred form of a harness 44 includes a fastening collar 80 best shown in FIGS. 2, 4 and 5, which includes a top ring 82 on the top surface of the membrane and a bottom ring 84 on the bottom surface 86 of the membrane. A pair of reinforcing discs 90 and 92 which may be fabric, or the like, are interpositioned between the rings and the fabric as shown in FIG. 5. A fastener, such as a stainless steel nut 96 and bolt 98, attaches the collar elements together with the membrane sandwiched between the discs 90 and 92, which, in turn, are sandwiched between the rings 82 and 84. Fastener receiving holes can be defined in the collar elements and the membrane to facilitate the just-described attachment. The discs prevent leakage of condensate through the collar.

Each of a plurality of cables 100 has cable hooks 102 and 104 at the opposite ends of that cable, and is attached to the connector collar at one end and to the riser pipe 20 at the other end. Each cable includes a takeup means, such as turn buckle 106, for pulling that cable taut and assuring the establishment of proper tension on the membrane.

The bottom ring 84 of the collar has a plurality of eye pieces 110 on lower surface 112 thereof and the riser pipe has a plurality of eye pieces 116 thereon. The cable hooks 102 and 104 are attached to these eye pieces.

As best shown in FIG. 3, the preferred form of the membrane 32 includes a plurality of sections, and in the preferred form, has four sections. The sections are coupled together to form the membrane 32 by seams 120 best shown in FIGS. 3 and 6. The seams extend radially along the membrane and abutting section edges overlap to form a lap joint as shown in FIG. 6 for edges 130 and 132 of adjacent membrane sections 134 and 136. A plurality of fasteners 140 attach the overlapping edges together, and each fastener includes a top plate 142 and a stud 146 inserted therethrough. The stud has a head 150 which bears against the top plate 142 and a clip 152 is inserted through the stud to bear against bottom surface 156 of the bottommore membrane segment. The overlapping membrane section edges are thus sandwiched between the top plate 142 and the clip 152. The top plate 142 has an offset portion 160 and thus conforms to the stepped shape of the overlapping membrane edges to define a very secure attachment between those edges. Furthermore, the elements can be bored to facilitate the just-described attachment.

The seam fastener elements are preferably stainless steel, and the overlapping nature of the seam joints prevents leakage at the seams. Adhesive bonds can also be used to attach the membrane sections together.

An alternative embodiment of the condensate collector is shown in FIG. 7 and is indicated by the reference numeral 30'. The collector 30' includes an annular membrane 200 attached at an outer peripheral edge 202 thereof to a bracket 206 mounted on the inner surface of the tank wall 14, and at an inner peripheral edge 210 thereof to a bracket 214 mounted on the riser pipe 20. The brackets 206 and 214 are approximately co-level so the peripheral edges of the membrane 200 are essentially co-level.

The membrane spans the area between the riser and the wall attached brackets and has a downwardly extending bulge 220 located approximately centrally thereof. A condensate drain system 224 is fluidly connected to the membrane to conduct collected condensate out of the enclosure E. The drain system includes a flexible drain 230 fluidly attached to the membrane at or near the bulge 220, and preferably at a low point in the membrane, and a drain line 232 fluidly connected to the flexible drain and extending through the wall 14 to a suitable downspout or collection system, or the like.

Condensate dropping from the water container 16 is intercepted by the collector 30' prior to that condensate falling onto a ceiling C and is conducted out of the enclosure via the condensate drain system 224.

Thus, like the collector 30, collector 30' prevents water damage to a ceiling C by preventing condensate from reaching that ceiling. The membrane 200 can be unitary or in sections which are connected together at seams using seam connectors such as the seam connector shown in FIG. 6. The bracket 206 includes a web 240 attached to the tank wall, as by welds 242, or the like, and which extends radially inward of the enclosure E. An upright flange 244 is attached to the web 240, and the membrane is attached to one edge, preferably lower edge 246, of the flange 244. The membrane is folded over the flange edge and is attached thereto by a plurality of clips, such as Tinnerman clips (R), or the like. Reinforcement washers can also be sandwiched between the clips and the membrane if so desired to further ensure leakage prevention.

The bracket 214 includes a base 250 attached, as by welds, or the like, to the riser pipe and which extends radially outward of the riser pipe. A flange 252 is integral with the base 250 and, in the FIG. 7 embodiment, extends downwardly to define an L-shape for the bracket 214. The inner edge 210 of the membrane 200 is attached to the bracket flange 252 in a manner similar to the attachment of the membrane edge 202 to the bracket 206 using clips or the like, and washers, if so desired, to define a water-tight attachment.

Figure 11:
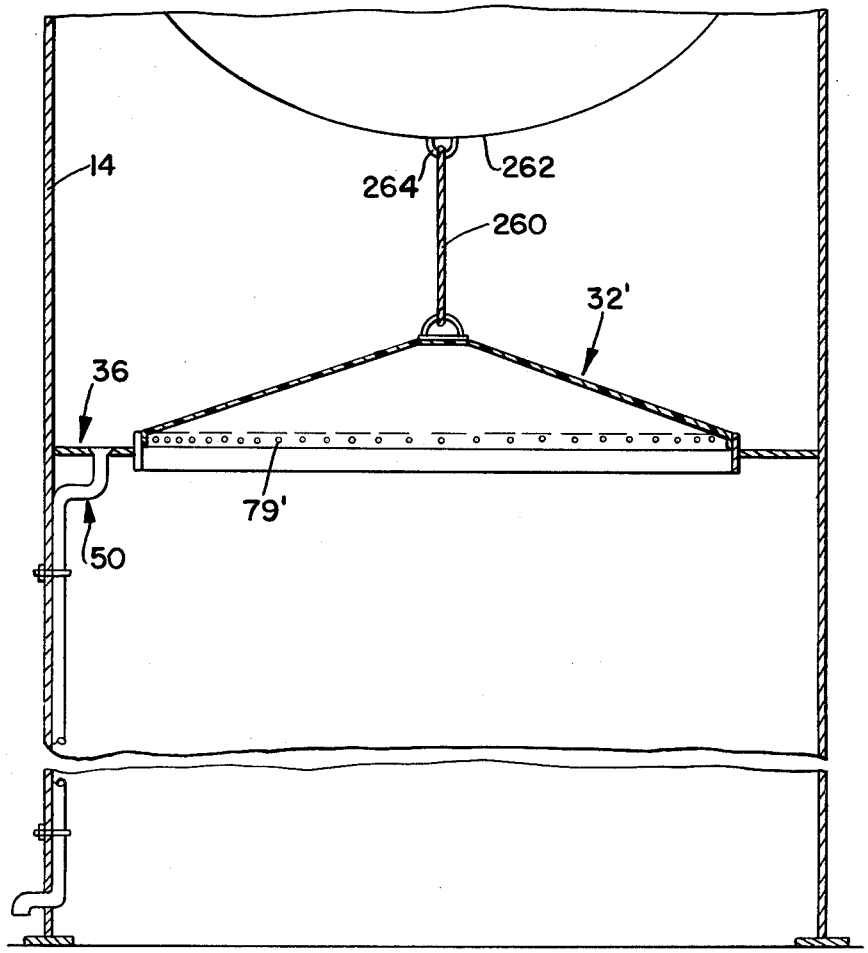
FIG. 11 is an elevation of an alternative embodiment of the condensation collector embodying the teachings of the present invention with a conical membrane inverted from that membrane position shown in FIG. 2.

Another alternative embodiment of the condensate collector includes a frusto-conical membrane 32' which is inverted with respect to the membrane 32 shown in FIG. 2, and such embodiment is shown in FIG. 11, with the bracket 36 forming the condensate collector and being located beneath the means supporting the apex section of the membrane, which may be the riser pipe, if so desired. The fluid line 50 is connected to the bracket 36 and conducts water collected from and in the stiffener ring 36 to the exterior of the tank. It is noted that in the FIG. 11 embodiment, the apex of the membrane is held high, as by cable 260 fixed to the underside 262 of the tank, or the like, by an anchor 264, or the like, and the water drains to the stiffener ring.

Furthermore, a plurality of radially oriented cables can be angularly spaced about the facility 10 to help carry the weight of the membrane and/or the weight of the water collected on that membrane.

The clips and other attachment means on all of the embodiments permit the condensate collectors to be easily removed when so desired. The removable nature of the collector facilitates renovation or alteration of the ceiling C and/or the work area W within the enclosure E, as well as rapid attachment of the membrane during a setup procedure.

Yet another alternative embodiment of the condensate collector is shown in FIG. 8, wherein membrane 32" is attached to a stiffening ring 36 by bolts 79' and is inverted with respect to membrane 32 shown in FIG. 2. The membrane 32" is hemispherically shaped with the highest point thereof attached to the stiffening ring, and the lowest point thereof located at or near the center of the water storage facility tank wall 14. The water storage facility of FIG. 8 has no riser pipe similar to the riser pipe 20 of FIG. 2.

Figure 10:
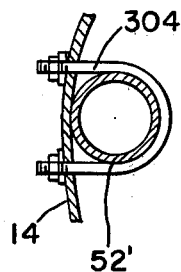
FIG. 10 is a view taken along line 10—10 of FIG. 8.

As shown in FIG. 8, a drain means includes a drain hose 52' fluidly attached to the membrane at the lowest point thereof by a coupling 300 which includes a sump means 302 into which condensate collects. The membrane can be cut and reinforced adjacent the coupling 300 if so desired. The drain hose extends from the sump 300 to the tank wall 14 and is attached thereto by U-bolts 304, or the like as best shown in FIG. 10. The hose then follows the tank wall, and extends outwardly of the tank through a suitable penetration at or near the base of that tank. The condensate is thus conducted out of the tank to a suitable disposal area, or disposal means (not shown). An erection lifting lug 306 is also included.

Figure 9:
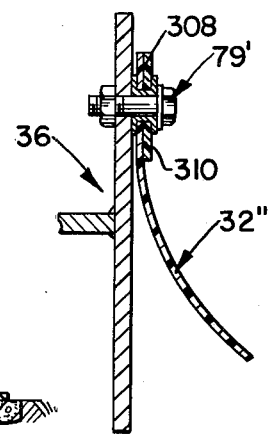
FIG. 9 is a view taken along line 9 of FIG. 8 and shows a bolted attachment of a membrane to a stiffener ring mounted on a wall of the water storage facility.

The bolted connection between the membrane and the stiffener ring 36 is best shown in FIG. 9, and a washer 308 is interposed between the bolt and the membrane. A bolt sleeve 310 is also included to protect the membrane. The bolted connection can be used with any of the membranes disclosed herein. The bolts can be grommets, if so desired. The membrane can be doubled over itself in place of the washer 308 if so desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An improvement in an elevated water storage facility including a water storage tank supported on top of an enclosed column and a partition means extending across the column dividing the enclosed column into an air space above the partition and a work area for offices, warehouses, and the like located beneath the partition with elements located in the work area which can be damaged by condensate falling thereonto from the tank, the improvement comprising collecting means for collecting condensed water vapor which drips from the underside of said tank, the collecting means including:
   attaching means mounted on a wall of the enclosed column above the partition;
   a membrane attached to said attaching means and mounted inside the column at a location between the tank and the partition for collecting any condensate falling from the tank prior to that condensate falling onto the partition; and
   drain means fluidly connected with said membrane for conducting condensate collected by said membrane away from said membrane.

2. The improvement defined in claim 1 wherein said attaching means includes a mounting base attached to the column wall and having a membrane attaching face spaced radially inward from the column wall, said membrane being attached to said attaching face so that said membrane is attached to said attaching means at a location spaced from the column wall.

3. The improvement defined in claim 2 wherein said mounting base includes means for stiffening the column wall.

4. The improvement defined in claim 1 further including an erection lifting lug mounted on said membrane.

5. The improvement defined in claim 1 wherein said drain means further includes a sump located centrally of said membrane and a drain conduit located beneath said membrane and fluidly connected to said sump.

6. The improvement defined in claim 5 wherein said drain conduit extends radially outward from said sump toward the column wall and contacts that column wall at a location above the partition.

7. The improvement defined in claim 6 wherein said drain conduit is attached to the column wall and extends downwardly along that column wall.

8. The improvement defined in claim 7 wherein said drain conduit extends through the column wall.

9. An improvement in an elevated water storage facility including a water storage tank supported on top of an enclosed column, the column being divided into an air space and a work area for offices, warehouses, and the like with elements located in the work area which can be damaged by condensate falling thereonto from the tank, the improvement comprising collecting means for collecting condensed water vapor which drips from the underside of said tank, the collecting means including:

attaching means mounted on a wall of the enclosed column above the work area;

a membrane attached to said attaching means and mounted inside the column at a location between the tank and the work area for collecting any condensate falling from the tank prior to that condensate falling into the work area; and drain means fluidly connected with said membrane for conducting condensate collected by said membrane away from said membrane.

* * * * *